(12) United States Patent
Loscher

(10) Patent No.: US 7,398,704 B2
(45) Date of Patent: Jul. 15, 2008

(54) SENSOR ASSEMBLY AND METHOD OF ASSEMBLING A SENSOR MODULE IN A TRANSMISSION

(75) Inventor: Frank Loscher, Tecumseh (CA)

(73) Assignee: GM Global Technology Operations, Inc., Detroit, MI (US)

( * ) Notice: Subject to any disclaimer, the term of this patent is extended or adjusted under 35 U.S.C. 154(b) by 136 days.

(21) Appl. No.: 11/402,616

(22) Filed: Apr. 12, 2006

(65) Prior Publication Data

US 2007/0163337 A1 Jul. 19, 2007

Related U.S. Application Data

(60) Provisional application No. 60/756,152, filed on Jan. 4, 2006.

(51) Int. Cl.
*G01D 21/00* (2006.01)
(52) U.S. Cl. .................................... 73/866.5
(58) Field of Classification Search ............... 73/493, 73/431, 866.5, 117.1, 117.2, 117.3, 116; 324/262, 207.25, 174
See application file for complete search history.

(56) References Cited

U.S. PATENT DOCUMENTS

| | | | |
|---|---|---|---|
| 6,774,623 B2 * | 8/2004 | Palfenier et al. | 324/207.15 |
| 6,788,054 B2 * | 9/2004 | Collins et al. | 324/262 |
| 6,851,306 B2 * | 2/2005 | Shost et al. | 73/119 R |

* cited by examiner

*Primary Examiner*—Helen C. Kwok

(57) ABSTRACT

A sensor assembly is provided with a speed sensor module that is rotatable relative to a bracket between first and second positions. The sensor module need not be translated to accomplish the rotation; therefore, it may remain installed through an aperture of a transmission casing and adjustment between the positions will not involve fluid leakage. The sensor module and the bracket interfit to establish and define both the first and second positions. A method of assembling a sensor module in a transmission includes loosening a bolt holding a bracket to a transmission casing, sliding the bracket relative to the sensor module, and then rotating a sensor module between first and second positions without removing or even translating the module in the casing aperture. Preferably, testing of the sensor module occurs when it is in the first position and the second position is an in-use position.

13 Claims, 2 Drawing Sheets

SENSOR ASSEMBLY AND METHOD OF ASSEMBLING A SENSOR MODULE IN A TRANSMISSION

CROSS-REFERENCE TO RELATED APPLICATIONS

This application claims the benefit of U.S. Provisional Application 60/756,152, filed Jan. 4, 2006, which is hereby incorporated by reference in its entirety.

TECHNICAL FIELD

The invention relates to a sensor assembly for a transmission and a method of assembling a sensor module in a transmission.

BACKGROUND OF THE INVENTION

Transmission output speed sensor modules are typically inserted through the transmission casing so that the sensor end is in the immediate proximity of a non-contact ring with protrusions on its perimeter that are detected by the sensor as they pass by it. The sensor is in contact with transmission fluid within the transmission and an electrical connector end is located outside of the transmission casing, with the electrical connector accessible for connection via wiring to an electronic control module. A dedicated opening through the casing is required for the sensor module. Additionally, a bracket that secures the sensor module portion to the casing is typically bolted to the casing, thus requiring a dedicated bolt opening in the casing. Output speed sensors are tested to ensure functionality within the transmission prior to being shipped to the vehicle assembly plant. A test stand specifically designed to support the transmission during testing is used by the transmission original equipment manufacturer to fully test the transmission and its components (including the output speed sensor). Electrical connectors are positioned on the stand in a location that allows the test stand electrical connectors to interface with the sensor module electrical connector, assuming a standard installed position of the sensor module. If a different installed position of the sensor module is necessary for a different vehicle model, this may be inconsistent with the test stand design. For instance, the test stand electrical connectors may not be able to interface with an electrical connector on the sensor module when the sensor module electrical connector is in a different orientation. Significant capital expenditure would be required to alter the test stand to accommodate more than one electrical connector position or to provide a modified transmission casing in order to reposition the sensor module. Repositioning of either or both the bolt location and the sensor module opening in the casing would require recasting of and retooling for the transmission.

SUMMARY OF THE INVENTION

A sensor assembly is provided with a speed sensor module that is rotatable relative to a bracket between a first position and a second position. The sensor module has a central axis about which it is rotatable. The sensor module need not be translated along the axis to accomplish the rotation; therefore, it may remain installed axially through an aperture of a transmission casing and adjustment between the positions will not involve fluid leakage. The sensor module and the bracket interfit to establish and define both the first and second positions. The sensor module cannot rotate relative to the bracket when interfit with the bracket in the first and second positions. Thus, installation error is minimized. The sensor module is fully operative in both positions. Thus, one position may be optimal for purposes of testing while the other position may be optimal for in-vehicle use with associated packaging issues.

A method of assembling a sensor module in a transmission includes loosening a bolt holding a bracket to a transmission casing, sliding the bracket relative to the sensor module, and then rotating the sensor module in a casing aperture between first and second positions without removing or even translating the sensor module in the casing aperture. Preferably, testing of the sensor module occurs when it is in the first position. Once tested, the module may be rotated to the second position either prior to or after installation of the transmission on a vehicle chassis. If shipped between testing and installation, the module may be placed in whichever one of the two positions minimizes damage to the module. The second position is the in-use position, and is optimized for packaging with other components.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
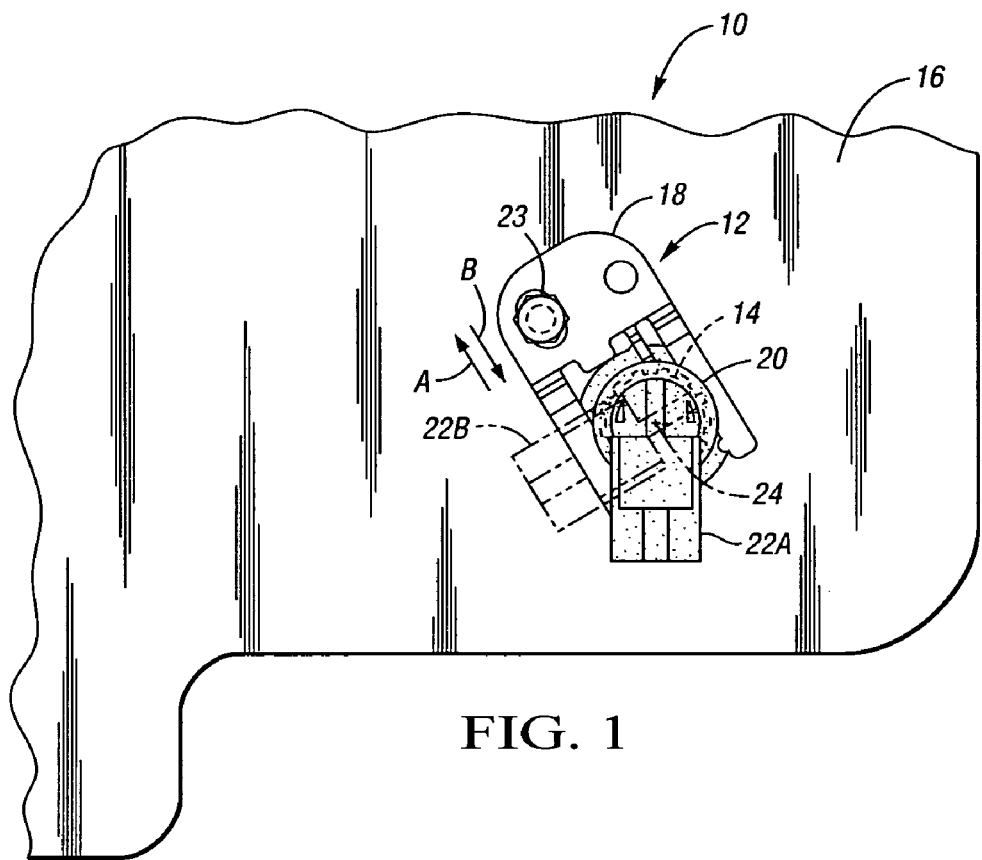
FIG. 1 is a schematic, fragmentary side-view illustration of a transmission having a sensor assembly installed thereon with a sensor module shown in a first position and in a second position (in phantom) rotated with respect to the first position.
Figures 3, 4:
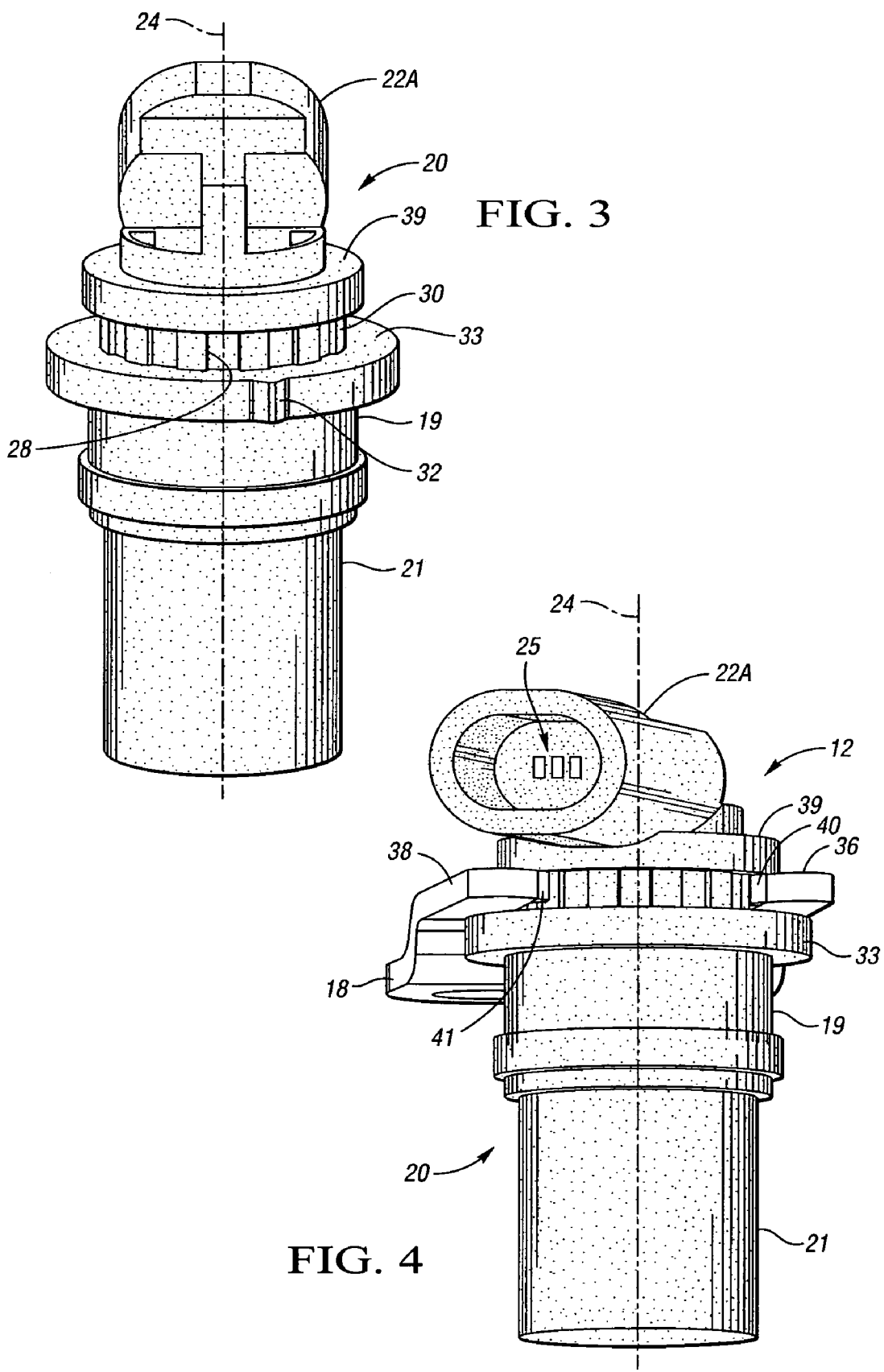
FIG. 3 is a schematic perspective view of the sensor module used in the sensor assembly of FIGS. 1 and 2.
FIG. 4 is a schematic perspective illustration of the sensor assembly of FIGS. 1 and 2 showing an electrical connector within an electrical connector portion of the sensor module.

Referring to the drawings, wherein like reference numbers refer to like components, FIG. 1 schematically shows a transmission 10 having a sensor assembly 12 installed thereon. An aperture 14 extending through a casing 16 of the transmission 10 allows a portion of the sensor assembly 12 to extend within the transmission 10 for sensing rotational speed of an output member (not shown) as is understood by those skilled in the art. The sensor assembly 12 includes a bracket 18 as well as a sensor module 20. Referring to FIG. 3, the sensor module 20 includes a plastic body 19 including a generally cylindrical portion 21 overmolded over a magnetic pickup (not visible within the body 19) and including an electrical connector 25 (see FIG. 4) within an electrical connector portion of the body 19. The body 19 of the sensor module 20 is generally cylindrical so that the sensor module 20 has a central axis 24. The electrical connector portion is shown in a first position in which the electrical connector portion is referred to as 22A. The sensor module 20 may be a solid state sensor, a variable reluctance sensor, a magneto-restrictive sensor or a Hall effect sensor, all of which function to create and relay an electrical signal corresponding with the speed of an output member of the transmission. Such sensors are well understood by those skilled in the art. The sensor module 20 must be oriented in the casing 16 with respect to the output member to be able to establish the corresponding signal. The bracket 18 is bolted to the casing 16 with a bolt 23 to secure the sensor module 20 in a desired rotational position. The sensor module body 19 includes the electrical connector portion 22A that extends radially with respect to the cylindrical portion 21 of the body 19 that extends through the transmission aperture 14. In FIG. 1, the sensor module 20 is shown in the first position in which the electrical connector portion 22A extends generally downward (i.e., in a six o'clock position with respect to the casing 16). The sensor assembly 12 is designed as described herein to allow the sensor module 20 to be rotated about axis 24 to a second position in which the electrical connector portion is designated 22B in FIG. 1. Preferably, the second position is rotated approximately 55 degrees from the first position, although the bracket 18 and sensor module 20 can be designed to allow a rotation of virtually any angle for the second position. The electrical connector portion 22A is rigidly formed with respect to the cylindrical portion 21 of the body 19 and rotates therewith so that it is accessible at two different locations, the generally vertical location (see FIG. 1) consistent with the first position of electrical connector portion 22A and a second location consistent with the second position in which the electrical connector portion is designated 22B.

Figure 2:
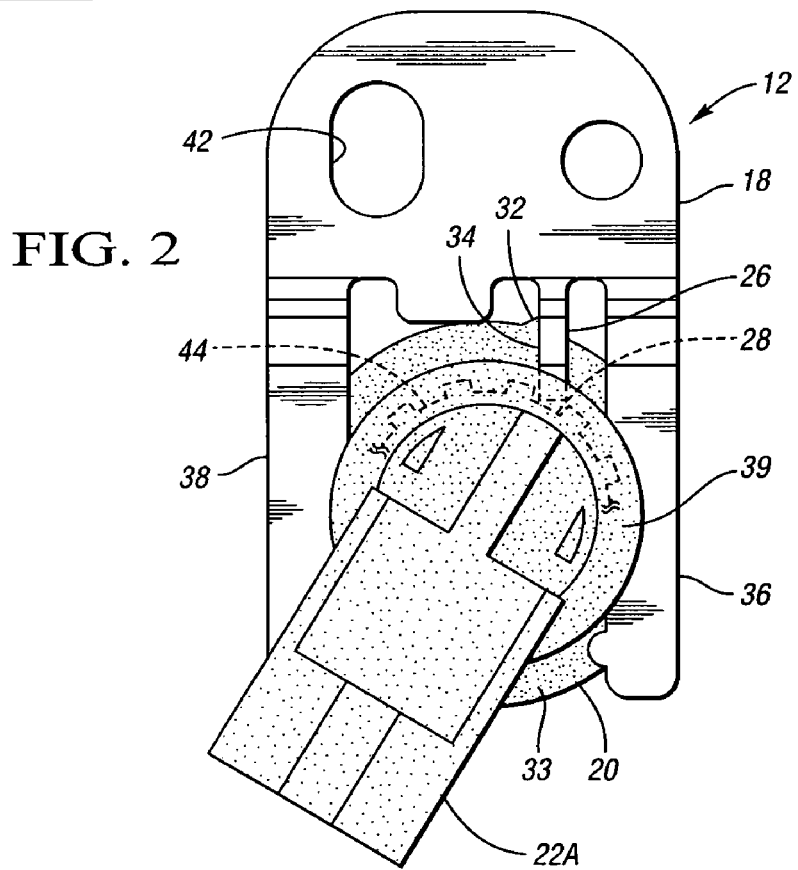
FIG. 2 is a side-view of the sensor assembly of FIG. 1.

Referring now to FIG. 2, the sensor assembly 12 is shown with the sensor module 20 orientated in the first position of FIG. 1. The first position is established by interfacing the bracket 18 with the sensor module 20. Specifically, a locking finger or extension 26 formed on the bracket 18 extends within a first recess 28 formed along an outer surface 30 of the sensor module 20, as may be better viewed in FIG. 3. A protrusion or stopper 32 extending radially from a circumferential shoulder 33 of the sensor module 20 rests against a shoulder portion 34 (see FIG. 2) of the finger 26 to further establish the first position. When the bolt 23 of FIG. 1 is tightened, first and second arms 36, 38 of the bracket 18 rest against the shoulder 33 of the sensor module 20 (better viewed in FIG. 3), providing an axial tightening force to secure the relative positioning of the bracket 18 and sensor module 20 to one another and to the casing 16, and thereby lock the finger 26 within the recess 28 and against the protrusion 32. The arms 36, 38 are between the circumferential shoulder 33 and a second circumferential shoulder 39 to partially surround the sensor module 20. First and second inwardly-extending detents 40, 41 extend from the respective bracket arms 36, 38, to further surround the sensor module 20 and prevent the bracket 18 from moving from around the sensor module 20, as the detents 40, 41 establish a clearance smaller than the outer diameter of the portion of the sensor module body 19 between the shoulders 33, 39. In order to rotate the sensor module 20 to the second position indicated in FIG. 1, the bolt 23 is loosened and the bracket 18 is slid radially away from the sensor module 20 (in the direction of arrow A of FIG. 1). A slotted opening 42 of the bracket 18 through which the bolt 23 extends allows the bracket 18 to be slid radially with respect to the sensor module 20 without removing the sensor module 20 from the aperture 14 of FIG. 1. In fact, the sensor module 20 is not translated along axis 24 when it is rotated from the first position to the second position. Sliding the bracket 18 removes the finger 26 from the recess 28 and the shoulder portion 34 from contact with the protrusion 32. Thus, the sensor module 20 may be rotated clockwise in FIG. 2 until recess 44 is in the same position as recess 28 was in the first position, such that the finger 26 aligns with the second recess 44. The bracket 18 is then slid radially toward the sensor module 20 (in the direction of Arrow B of FIG. 1) so that the finger 26 extends within the second recess 44, thus preventing further rotation of the sensor module 20 relative to the bracket 18. The bolt 23 is then tightened to maintain the relative position of the sensor assembly 12 with respect to the casing 16 and the sensor module 20 with respect to the bracket 18.

By providing a sensor assembly 12 that may be rotated from first to second positions without removing or even translating the sensor module 20 along axis 24 with respect to the aperture 14 in the casing 16, the first and second positions may be advantageously employed with respect to required testing and function of the sensor assembly 12. For instance, it may be desirable to maintain the sensor module 20 in the first position for testing. An available test stand which must interface with the electrical connector 25 may be designed to align with the electrical connector portion 22A when it is in the first position. This is likely if the first position is also the in-use position on a vehicle model having the transmission for which the test stand was originally designed. The second position of the electrical connector portion 22B in FIG. 1 may be desirable to alleviate other interference issues that may arise with installation on a vehicle, for instance, other vehicle components or electrical wiring may interfere with the first position. Thus, the two relative positions are achieved with a minimum number of process and assembly steps, namely loosening the bracket 18 with respect to the casing 16, sliding the bracket 18 and rotating the sensor module 20 along axis 24 to the second position. The bracket is first slid away from the sensor module to allow rotation of the module and then slid back toward the sensor module such that the finger 26 interfits with the second recess 44 of the sensor module body portion 19 to establish the second position. Because translation of the sensor module 20 along axis 24 in the aperture 14 is not necessary, transmission fluid leakage is avoided. Additionally, it may be advantageous to ship the transmission 10 from an assembly location to an installation location with the sensor module 20 in the first position. During transport at the assembly location and shipping to the installation location, the center of mass of a typically non-symmetrical transmission may cause a tendency to tip. The narrower profile of the essentially vertical electrical connector portion 22A of the sensor module 20 in the first position (when viewed from below) minimizes breakage during shipping of the transmission 10.

Other embodiments of a sensor assembly may also be employed within the scope of the present invention. For example, a bracket having a transverse slot may be used that interfaces with two pins circumferentially-spaced from one another and formed in the sensor module body. The pins may be spaced such that they fall at opposing ends of the slot, spanning the width of the slot, thus preventing rotation of the sensor module relative to the bracket and establishing a first position. If one of the pins is of a relatively weak material, such as plastic, it may be sheared when an assembler loosens the bolt and applies sufficient rotational force, thus allowing rotation of the sensor module relative to the bracket. The other pin, which is preferably a relatively strong material, such as metal, will act as a stopper when the sensor module is rotated to an extent such that the metal pin reaches the opposing end of the bracket slot, establishing a second position. The bolt may then be tightened to so that the bracket secures the sensor module in the new position.

While the best modes for carrying out the invention have been described in detail, those familiar with the art to which this invention relates will recognize various alternative designs and embodiments for practicing the invention within the scope of the appended claims.

The invention claimed is:

1. A sensor assembly comprising:
a sensor module with an elongated, generally cylindrical body having a central axis;
a bracket configured to interfit with said sensor module to prevent rotation of said sensor module about said axis when said sensor module is in a first position;
wherein said bracket is movable radially away from said sensor module to permit rotation of said sensor module about said axis to a second position without translation of said sensor module along said axis; and wherein said bracket and said sensor module are further configured to interfit to prevent rotation of said sensor module about said axis when said sensor module is in said second position.

2. The sensor assembly of claim 1, wherein said sensor module has first and second recesses formed therein and spaced at least partially around an outer surface thereof; and wherein said bracket has an extension extending at least partially within said first recess when said sensor module is in said first position to prevent rotation of said sensor module about said axis and extending at least partially within said second recess when said sensor module is in said second position to prevent rotation of said sensor module about said axis.

3. The sensor assembly of claim 2, wherein said sensor module has a circumferential shoulder with a radially-extending protrusion, wherein said extension abuts said protrusion when said sensor module is in said first position, said protrusion thereby serving as a locator for interfitting said bracket relative to said sensor module.

4. The sensor assembly of claim 1, wherein said sensor module has an electrical connector portion extending radially therefrom; and wherein rotating said sensor module about said axis serves to rotate said electrical connector portion about said axis, thereby providing access to said electrical connector portion at two different locations corresponding with said first and second positions.

5. The sensor assembly of claim 1, wherein said bracket has bracket arms partially surrounding said sensor module; wherein said sensor module has a circumferential shoulder extending therefrom; and wherein said bracket arms contact said circumferential shoulder for providing axial force thereto.

6. The sensor assembly of claim 5, wherein each of said bracket arms has a detent extending radially inward therefrom to further surround said sensor module and limit movement of said sensor module and said bracket relative to one another.

7. A transmission comprising:
a transmission casing having an aperture;
a sensor module with an elongated, generally cylindrical body having a central axis and configured to extend through said aperture into said casing;
a bracket connectable to said casing and configured to interfit radially with said sensor module outside of said casing to prevent rotation of said sensor module about said axis when said sensor module is in a first position;
wherein said bracket is slidable radially away from said sensor module to permit rotation of said sensor module about said axis to a second position without translation of said sensor module along said axis in said aperture; and wherein said bracket is further configured to interfit radially with said sensor module to prevent rotation of said sensor module about said axis when said sensor module is in said second position.

8. The transmission of claim 7, wherein said sensor module has a circumferential shoulder with a radial protrusion thereon, wherein said bracket has an extension; and wherein said extension abuts said protrusion to prevent rotation of said sensor module when said sensor module is in said first position.

9. The transmission of claim 8, wherein said sensor module has first and second spaced recesses formed thereon; wherein said extension extends into said first recess when said sensor module is in said first position to prevent rotation of said sensor module about said axis; and wherein said extension extends into said second recess when said sensor module is in said second position to further prevent rotation of said sensor module about said axis.

10. The transmission of claim 7, wherein said sensor module is a transmission output speed sensor with an integral electrical connector positioned outside of said casing when said sensor module is in either of said first and said second position.

11. A method of assembling a sensor module having a central axis and inserted along said axis through an aperture in a transmission casing of a transmission, comprising:
loosening a bolt holding a bracket to the transmission casing;
sliding the bracket relative to the sensor module; and
rotating the sensor module about the axis from a first position to a second position, said positions being established by an interface between said sensor module and said bracket; and wherein said rotation from said first position to said second position is accomplished without translating the sensor module along the axis in the aperture.

12. The method of claim 11, further comprising:
testing said sensor module when said sensor module is in said first position; and
installing the transmission on a vehicle with the sensor module in the second position.

13. The method of claim 12, further comprising:
transporting the transmission with the sensor module in the first position prior to said installing the transmission.

* * * * *